United States Patent [19]

Kojima et al.

[11] Patent Number: 5,168,363
[45] Date of Patent: Dec. 1, 1992

[54] VIDEO SIGNAL PAROCESSING APPARATUS WITH MEMORY AND CROSSFADER

[75] Inventors: Masaaki Kojima; Kazuo Yoshino; Teruhiko Kori; Takao Takahashi, all of Tokyo; Koji Iijima, Kanagawa, all of Japan

[73] Assignee: Sony Corporation, Tokyo, Japan

[21] Appl. No.: 597,332

[22] Filed: Oct. 15, 1990

[30] Foreign Application Priority Data

Oct. 16, 1989 [JP] Japan .................. 1-268845
Oct. 18, 1989 [JP] Japan .................. 1-270789

[51] Int. Cl.[5] ............... H04N 5/272; H04N 5/262
[52] U.S. Cl. ..................... 358/183; 358/182; 358/167; 358/906; 358/209
[58] Field of Search ........... 358/183, 182, 181, 180, 358/22, 167, 166, 36, 37, 909, 906, 209

[56] References Cited

U.S. PATENT DOCUMENTS

| | | | |
|---|---|---|---|
| 4,107,739 | 8/1978 | Rossi | 358/167 |
| 4,240,106 | 12/1980 | Michael | 358/36 |
| 4,249,209 | 2/1981 | Storey | 358/167 |
| 4,644,400 | 2/1987 | Kouyama | 358/149 |
| 5,003,404 | 3/1991 | Yoshimura | 358/182 |

FOREIGN PATENT DOCUMENTS

62-3639 1/1987 Japan .

Primary Examiner—James J. Groody
Assistant Examiner—Sherrie Hsia
Attorney, Agent, or Firm—Lewis H. Eslinger; Donald S. Dowden

[57] ABSTRACT

A video signal processing apparatus for performing editing of video signals includes a memory into which one field or one frame of a moving picture video signal from a video camera is written and a crossfading circuit, wherein a still picture of the video signal is written in the memory at a selected time or at a time the video camera stops operation. Thereafter, when the video camera resumes operation, the contents of the memory are read out, so that the real moving picture video signal being currently provided by the video camera and the previous still picture video signal read out from the memory are crossfaded. The video signal processing apparatus can also cooperate with a video tape recorder for storing in the memory a still picture derived from the video tape recorder, so that when the video camera starts its operation, the real moving picture video signal produced by the video camera and a still picture video signal from the memory are crossfaded.

9 Claims, 8 Drawing Sheets

VIDEO SIGNAL PAROCESSING APPARATUS WITH MEMORY AND CROSSFADER

BACKGROUND OF THE INVENTION

1. Field of the Invention

The present invention relates generally to video signal processing apparatus for use with a video camera and, more particularly, to a video signal processing apparatus for use with a video tape recorder (VTR) having a built-in camera.

2. Description of the Background

In previously proposed systems when video and audio program data from various sources are edited in order to remove discontinuities at the edit point, the signal level from the preceding data source is gradually decreased to present a fade-out effect, while at the same time the signal level of the following data source is gradually increased to present a fade-in effect. This technique is referred to as dissolve or crossfade and is frequently utilized when editing video data.

To perform this dissolve or crossfade operation, in addition to the two signal sources, such as a video camera and a video tape recorder (VTR), one more video tape recorder is required to record the crossfaded video signal. This results in a video signal processing apparatus that is both complicated and expensive.

OBJECTS AND SUMMARY OF THE INVENTION

Accordingly, it is an object of the present invention to provide an improved video signal processing apparatus that can eliminate the aforenoted shortcomings and disadvantages inherent in previously proposed systems.

More specifically, it is an object of the present invention to provide a video signal processing apparatus that has a simplified arrangement.

It is another object of the present invention to provide a video signal processing apparatus in which pictures of the preceding and following scenes can be crossfaded smoothly at an edit point.

It is further object of the present invention to provide a video signal processing apparatus for use with a video tape recorder of the kind having a built-in video camera.

According to a first aspect of the present invention, a video signal processing apparatus is formed having a memory into which one field or one frame period of a real moving picture video signal from a video camera is written and a crossfading circuit. The real moving picture video signal that is being provided when the video camera stops its operation is written into the memory as a still picture and when the video camera is operated again the real moving picture video signal being produced at that time by the video camera and the still picture video signal from the memory are crossfaded.

In accordance with a second aspect of the present invention, a video signal processing apparatus includes a memory in which one field or one frame period of a real moving picture video signal from a video tape recorder is written as a still picture and a crossfading circuit, wherein when the video camera starts its operation the real moving picture video signal from the video camera and the still picture video signal from the memory are crossfaded.

The above and other objects, features, and advantages of the present invention will become apparent from the following detailed description of preferred embodiments when read in conjunction with the accompanying drawings, in which like reference numerals are used to identify the same or similar parts in the several views.

DETAILED DESCRIPTION OF PREFERRED EMBODIMENTS

Figure 1:
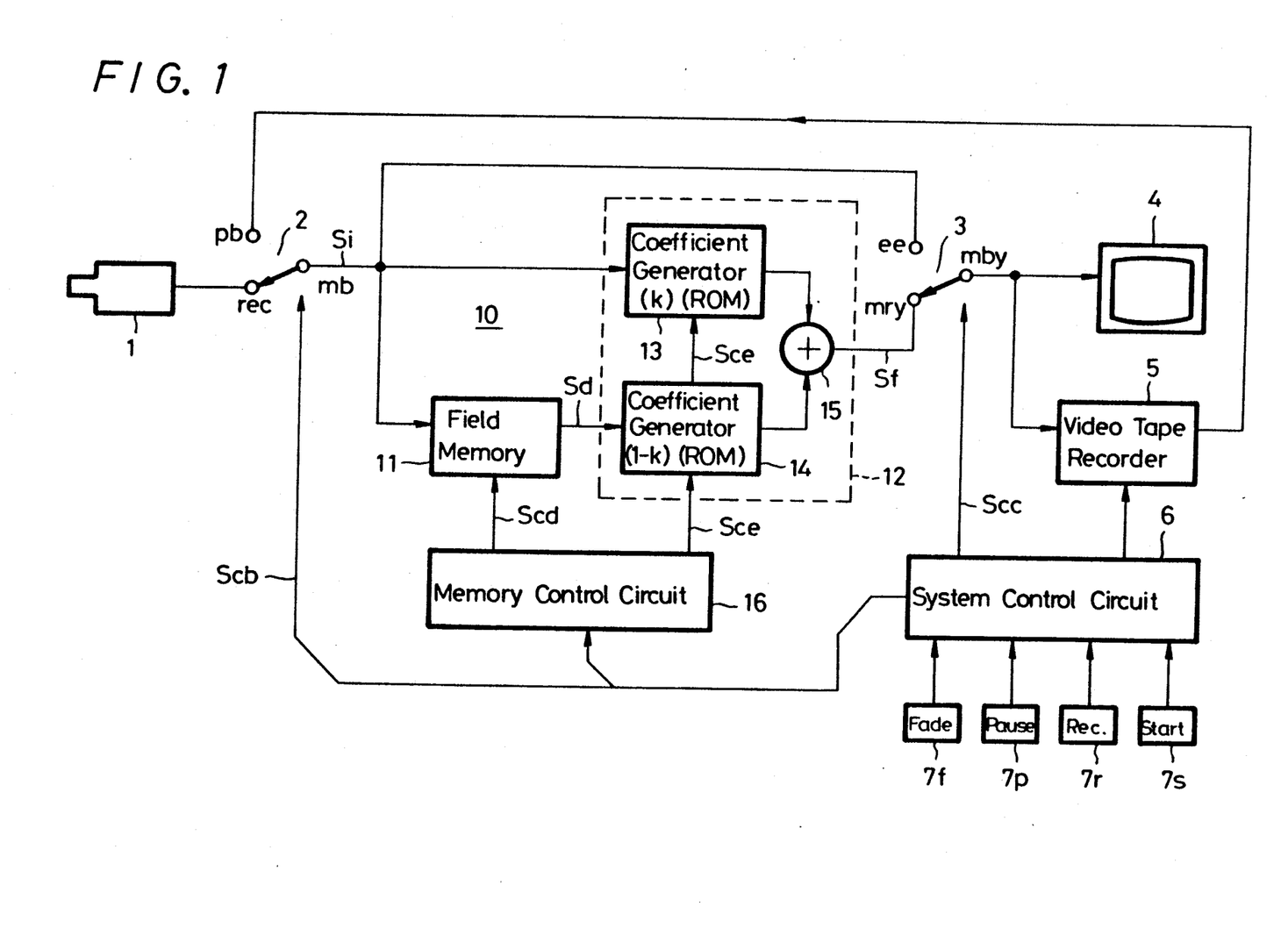
FIG. 1 is a schematic in block diagram form showing an embodiment of the video signal processing apparatus according to the present invention.

An embodiment of the video signal processing apparatus according to the present invention will hereinafter be described with reference to FIG. 1, FIGS. 2A-2G, and FIGS. 3A-3C, in which FIG. 1 is a block diagram of an overall arrangement of an embodiment of the present invention.

Referring to FIG. 1, a video signal processing apparatus 10 is mainly comprised of a field memory 11 and a crossfade circuit enclosed by a dashed line 12. The crossfade circuit 12 is formed of a pair of coefficient generators 13 and 14 and an adder 15. The two coefficient generators 13 and 14 each include a read only memory (ROM), not shown, and predetermined coefficient data are stored in each ROM.

An incoming video signal Si from a video camera 1 is supplied through a recording-side fixed contact rec of a change-over switch 2 and its movable contact mb to field memory 11, through coefficient generator 13 to an electronic edit-side fixed contact ee of a change-over switch 3.

A video signal Sd that has been delayed by one field period is supplied from field memory 11 to the second coefficient generator 14, and the outputs from the two coefficient generators 13 and 14 are added by adder 15. The crossfaded video signal Sf from adder 15 is supplied through a memory-side fixed contact mry of switch 3 and a movable contact mby of switch 3 to a monitor 4, which is typically the viewfinder of the video camera 1, and also to a video tape recorder 5. The output of video tape recorder 5 is supplied to a playback-side fixed contact pb of switch 2.

Control signals Scd and Sce from a memory control circuit 16 are supplied to field memory 11 and to the pair of coefficient generators 13 and 14, respectively. The change-over switches 2 and 3 and memory control circuit 16 are supplied with various control signals from a system control circuit 6 of video tape recorder 5 when corresponding keys 7f, 7p, 7r, 7s, and the operated.

System control circuit 6 may be advantageously embodied by a microcomputer.

The operation of the video signal processing apparatus of this embodiment will be explained in detail with reference to FIGS. 2A-2G and FIGS. 3A-3C. Initially, when the recording key 7r and the recording pausekey 7p are depressed simultaneously, video tape recorder 5 is set in the recording pause mode (REC PAUSE). At that time, the switch control signals Scb and Scc are at a low level "L" and at a high level "H", respectively, as show in FIGS. 2B and 2C. Change-over switch 3 is connected to the fixed contact ee, whereby the video signal Si from video camera 1 is directly supplied to monitor 4. Further, as shown in FIG. 2D, the memory control signal Scd is at a high level "H" and field memory 11 is placed in the write-inhibited state, that is, the hold state, so that some of the video signal of the previous picture is held therein. Also, a picture of the future scene to be taken, for example, a picture of mountain, as shown in FIG. 3A, is displayed on the picture screen of monitor 4 by reason of switch 3 being set to contact ee.

Figure 2A:
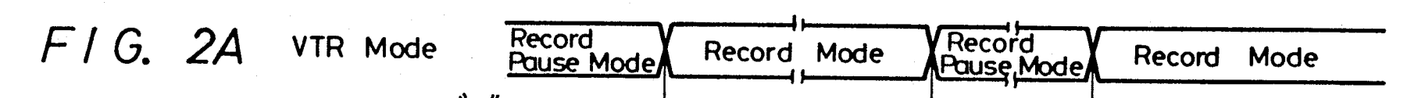
FIGS. 2A-2G are timing charts useful in explaining the operation of the embodiment of FIG. 1.
Figure 2B:
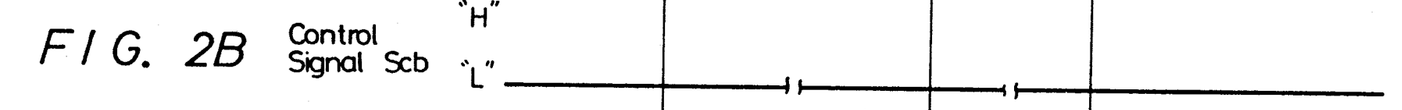
Figure 2C:
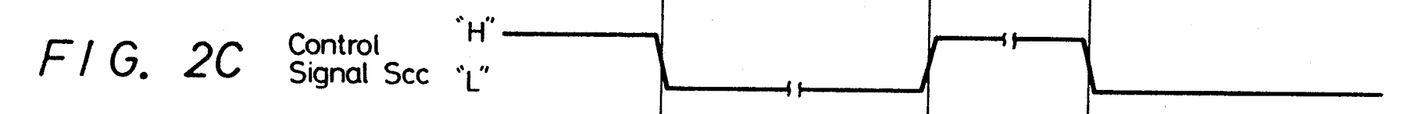
Figure 2D:
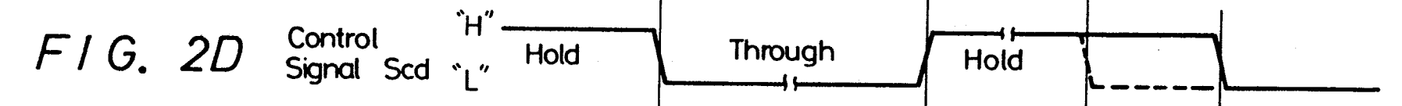
Figure 2E:
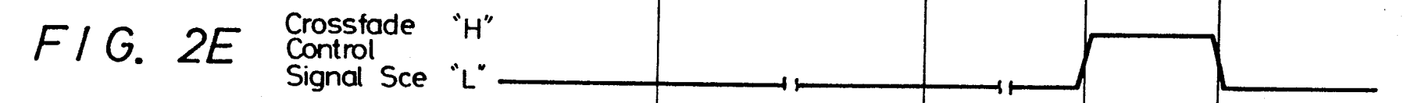

When the start key 7s is depressed at some time point t1 to place video tape recorder 5 in the recording mode, as shown in FIG. 2A, the control signal Scb remains at level low "L", and the control signal Scc goes to low level "L" from the high level "H", as shown in FIGS. 2B and 2C, so that change-over switch 3 is connected to the fixed contact mry, while change-over switch 2 is still connected to the fixed contact rec. Further, as shown in FIG. 2D, the control signal Scd goes to the low level "L" from the high level "H", whereby field memory 11 is switched from the hold mode to the write-enable mode. Then, as shown in FIG. 2E, the crossfade control signal Sce is at a low level "L", thereby setting the coefficients of the two coefficient generators 13 and 14 in the state of k=0.

Figure 2F:
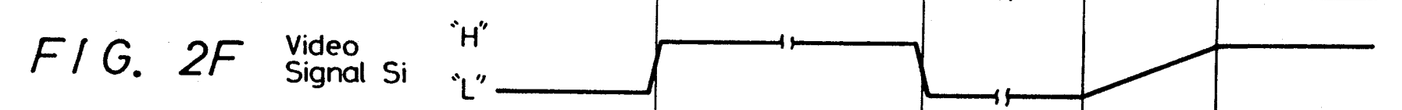
Figure 3A:
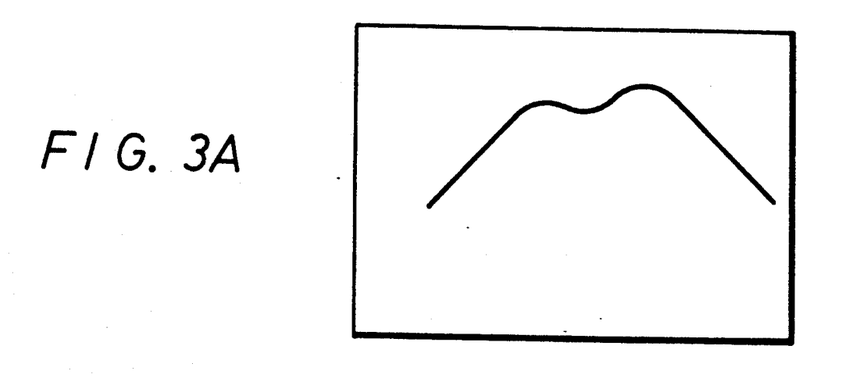
FIGS. 3A-3C are pictorial representations useful in understanding the operation of the present invention.

Therefore, as shown in FIG. 2F, the video signal Si from video camera 1 is not changed in level and is fed through field memory 11 and crossfade circuit 12 to video tape recorder 5, thereby recording the image of the preceding scene, for example the picture of a mountain as shown in FIG. 3A, on the magnetic tape of the video tape recorders.

When the pause key 7p is depressed at some time point t2, thereafter in order to once again set video tape recorder 5 in the recording pause mode, as shown in FIG. 2A, the movement of the magnetic tape is stopped and, as shown in FIGS. 2B and 2C, the control signal Scb remains at the low level "L" and the control signal Scc goes high "H". Thus, change-over switch 3 is connected to the fixed contact ee, while change-over switch 2 is still connected to the fixed contact rec. Further, as shown in FIG. 2D, the control signal Scd goes to the high level "H" from the low level "L", so that memory 11 is changed over to the hold mode from the write-enable mode.

Consequently, at the switching time point t2, the video signal of the picture recorded by video tape recorder 5, for example the picture of the mountain shown in FIG. 3A, is held in field memory 11. Also, the picture of the same mountain is displayed on the picture screen of monitor 4.

Figure 3B:
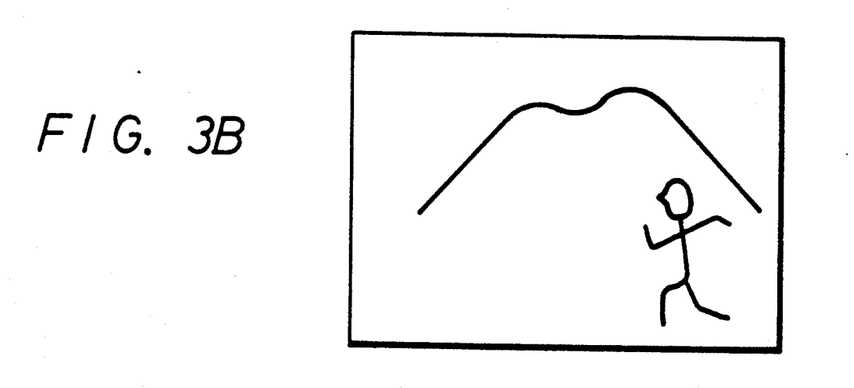
Figure 3C:
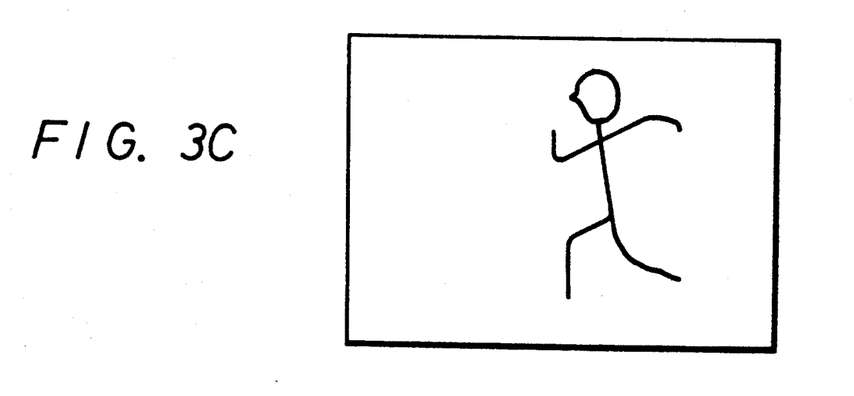

In this state, the image of the next scene, for example a man who is jogging as shown in FIG. 3C, is focused by video camera 1 and the fader key 7f is operated, thereby determining the crossfade scene.

When the start key 7s is depressed at some later time point t3 to once again set video tape recorder 5 in the recording mode, as shown in FIGS. 2B and 2C, the control signals Scb and Scc are returned to the same states as at the time point t1, whereby change-over switch 2 is connected to the fixed contact rec and change-over switch 3 is connected to the fixed contact mry.

During a predetermined period, which may be for example one second, from time point t3 to time point t4, as shown in FIGS. 2D and 2E, the control signal Scd is held at the high level "H", whereby the holding state of field memory 11 is extended and the crossfade control signal Sce goes high "H".

Thus, the crossfade circuit 12 operates as follows: Assuming that k and $(1-k)$, where $(0 \leq k \leq 1)$, are the coefficients of coefficient generators 13 and 14, respectively, then the output of adder 15, which is the crossfade video signal Sf, is expressed by:

$$Sf = k\,Si + (1-k)Sd \quad (1)$$

Figure 2G:
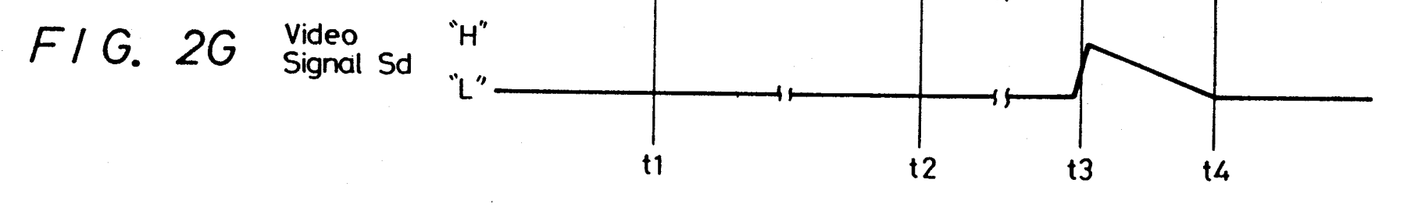

Thus, if the coefficient k is gradually increased from 0 to 1 over one second, for example, then as shown in FIGS. 2F and 2G the still picture video signal Sd read out from field memory 11 is faded out and, simultaneously, the incoming real picture video signal Si from video camera 1 is faded in.

During this crossfade period t3 to t4, as shown in FIG. 3B, pictures of preceding and following scenes are displayed on the screen of monitor 4 in an overlapping or coexistent condition, while the still picture video signal of the preceding scene and the real moving picture video signal of the following scene are recorded on the magnetic tape of video tape recorder 6 also in that overlapping condition.

After the time point t4, the real moving picture of a man who is jogging, as shown in FIG. 3C and corresponding to signal Si, is displayed on the screen of monitor 4 and also recorded on the magnetic tape.

Accordingly, when this magnetic tape is reproduced, the scenes before and after the edit point are smoothly changed or crossfaded across the overlapping portion.

A second embodiment of the video signal processing apparatus according to the present invention will be described with reference to FIG. 4, in which like parts corresponding to those of FIG. 1 are marked with the same references and therefore need not be described in detail.

Figure 4:
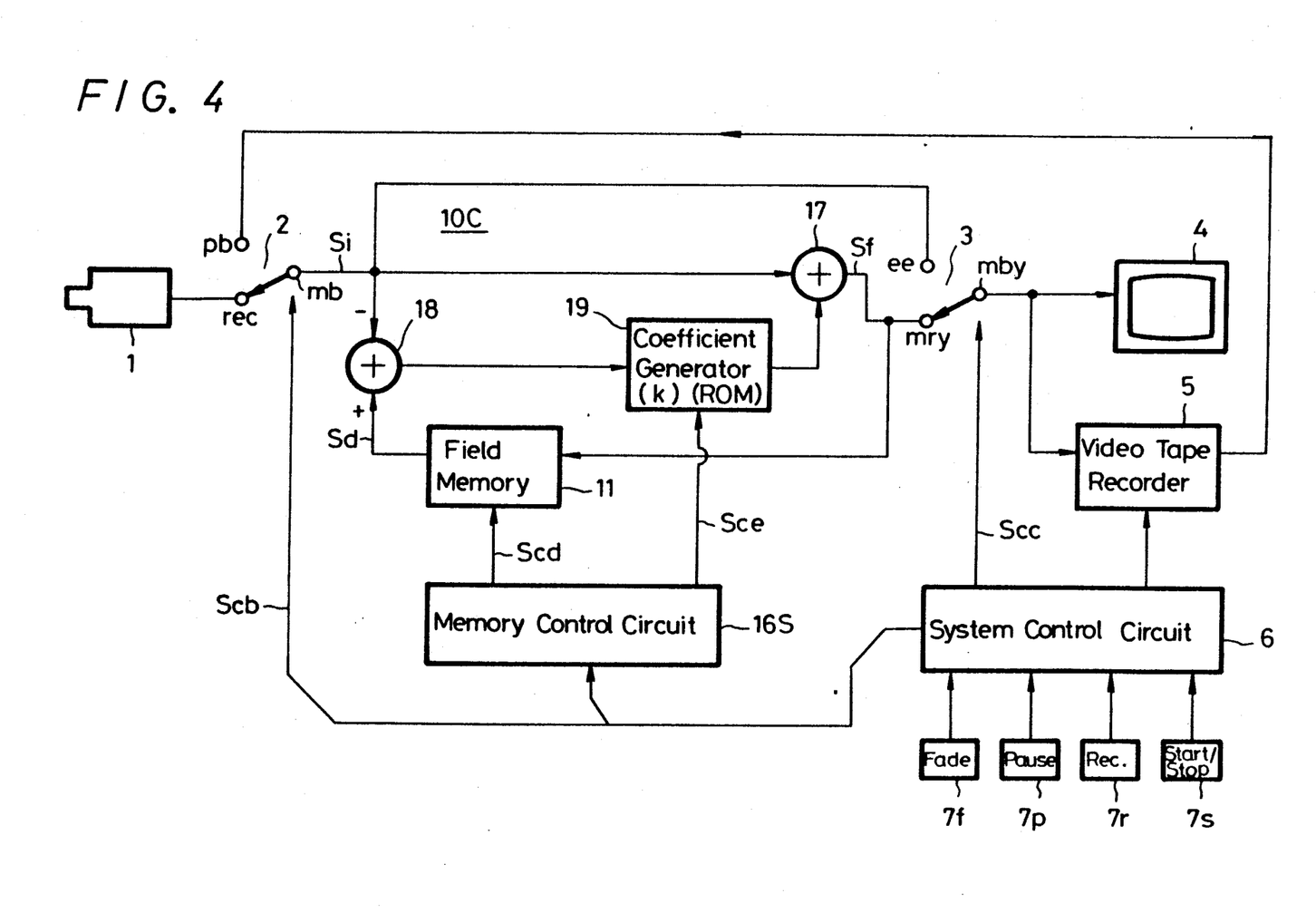
FIG. 4 is a schematic in block diagram form showing another embodiment of the video signal processing apparatus according to the present invention.

In FIG. 4, a video signal processing apparatus 10C has a loop, including the field memory, to form a cyclic-type crossfade circuit. The circuit arrangement of this cyclic-type crossfade circuit is analogous to a known noise reducing circuit (see Japanese Published Patent Gazette No. 62-3639). The incoming video signal Si from video camera 1 is supplied through the recording-side fixed contact rec and the movable contact mb of change-over switch 2 to the electronic edit-side fixed contact ee of change-over switch 3 through an adder 17 and a subtracter 18. An output signal Sf from adder 17 is supplied to the memory-side fixed contact mry of change-over switch 3 and to field memory 11. The video signal Sd, delayed by one field period, from field memory 11 is supplied to subtracter 18, in which the incoming video signal Si is subtracted from the delayed video signal Sd. The output from subtracter 1B is supplied through a coefficient generator 19 to adder 17.

A control signal Scd from a memory control circuit 16S is supplied to field memory 11. Similarly, control signals Scb and Sce are supplied to memory control circuit 16S and coefficient generator 19 from system control circuit 6, respectively. The remainder of the circuit arrangement of FIG. 4 is the same as FIG. 1.

In a crossfade operation of the embodiment of FIG. 4, and assuming that the coefficient of coefficient generator 19 is represented by k (0≦k≦1), then the output signal Sf of adder 17 will be expressed by:

$$Sf = Si + k(Sd - Si) \quad (2)$$
$$= (1 - k)Si + k Sd$$

If the coefficient k is gradually decreased from 1 to 0 in a manner opposite to that of the first embodiment of FIG. 1 during a time period of, for example, one second, the still picture video signal Sd read out from field memory 11 is faded out and the incoming real moving picture video signal Is from video camera 1 is simultaneously faded in.

In the embodiment of FIG. 4, the crossfade circuit is constructed as a cyclic type so that the video signal is written in field memory 11 line-by-line and read-out therefrom similarly, The video signal read-out from field memory 11 is supplied through subtracter 18, coefficient generator 19, and adder 17 back to field memory 11, in which it is written one more time. In that case, because of the signal processing time in coefficient generator 19 and the like, the line in which the video signal that was multiplied by the coefficient is written becomes the same line from which the original video signal is read out.

In the embodiment of FIG. 4, in the case of the crossfade operation, field memory 11 is set in the through-state in the recording mode, as shown by a broken line in FIG. 2D. During the crossfade period, t3 to t4, as earlier noted the pictures of the preceding and following scenes are recorded on the magnetic tape in an overlapping or coexistent state. After the time point t4, the real moving picture of the following scene is recorded so that the scenes before and after the edit point, or cue point, are crossfaded smoothly.

In the embodiment of FIG. 4, as compared with the embodiment of FIG. 1, the read and write timing of field memory 11 can be controlled with ease and the circuit scale of memory control circuit 16S can be reduced.

It should be noted that in both of the embodiments described so far the field memory may be replaced with a frame memory. Furthermore, when the crossfade circuit is formed as a cyclic type, the present invention can also be applied to noise reduction, to a so-called multi-strobe operation, to a clean still/slow playback and the like by properly selecting the data pattern of the coefficient generator.

As described above, relative to the two embodiments of the present invention, when the operation of the video camera is stopped, the real moving picture video signal is written into a field memory, or into a frame memory, so that when the operation of this video camera is resumed, the real moving picture video signal from the video camera and the still picture video signal read-out from the memory are crossfaded. Thus, the video signal processing apparatus of the invention is simplified in arrangement and can smoothly crossfade the scenes at the edit point without requiring an additional video tape recorder.

A further embodiment of the video signal processing apparatus according to the present invention will hereinafter be described with reference to FIG. 5 and FIGS. 6A–6G in which the video signal processing apparatus is mainly comprised of field memory 11 and crossfade circuit 12. Crossfade circuit 12 is comprised of a pair of coefficient generators 13 and 14, which each typically include a read only memory (ROM) and predetermined data, are stored in the two ROMs.

Figure 5:
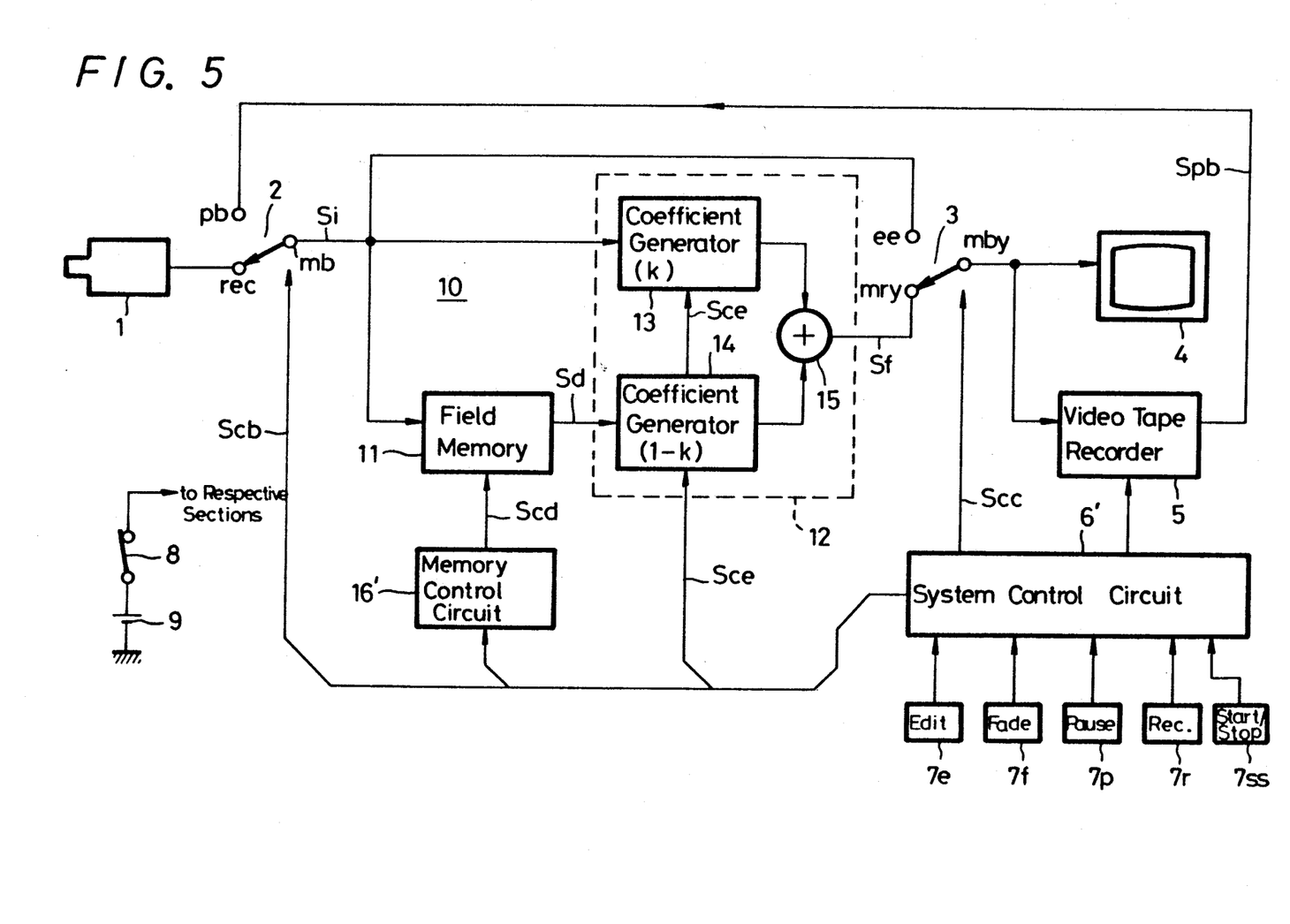
FIG. 5 is a schematic in block diagram form showing yet another embodiment of the video signal processing apparatus according to the present invention.

The incoming video signal Si from video camera 1 is supplied through the fixed contact rec of change-over switch 2 and its movable contact mb to field memory 11, to coefficient generator 13, and to the fixed contact ee of change-over switch 3. The video signal Sd, delayed by one field period from field memory 11 is supplied to coefficient generator 14 and the outputs from the two coefficient generators 13 and 14 are supplied to adder 15. The crossfade video signal Sf from adder 15 is supplied through the fixed contact mry and the movable contact mby of change-over switch 3 to monitor 4, which may be the viewfinder of camera 1, and to video tape recorder 5. The output from video tape recorder 5 is supplied to the fixed contact pb of change-over switch 2.

The control signal Scd from a memory control circuit 16' is supplied to field memory 11. Memory control circuit 16', change-over switches 2 and 3, and the two coefficient generators 13 and 14 are all supplied with various control signals corresponding to the operations of keys 7e, 7f, 7p, 7r, 7ss from the system control circuit 6, which may be formed by a microcomputer. System control circuit 6 also controls video tape recorder 5 too. An output from a power source 9 is supplied through a switch 8 to the respective portions of this video signal processing apparatus, such as the camera, the field memory, the coefficient generators, and the like.

Figures 6A, 6B:
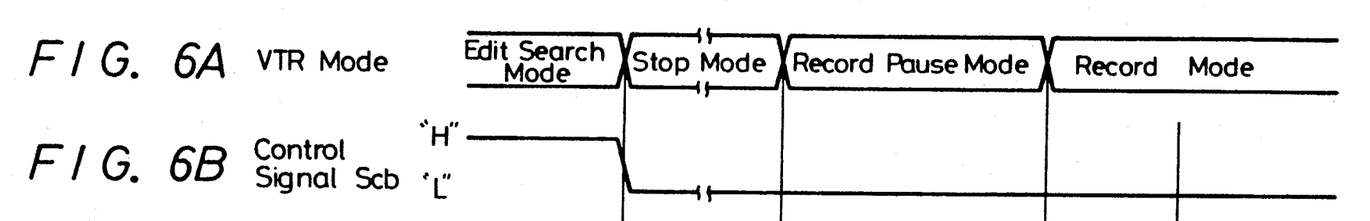
FIGS. 6A-6G are timing charts useful in explaining the operation of the embodiment of FIG. 4.

The operation of the embodiment of FIG. 5 will be described with reference to FIGS. 3A–3C and FIGS. 6A–6C. Initially, an edit reproduction key 7e is operated to set video tape recorder 5 in the edit and playback mode, that is, the edit search mode, as shown in FIG. 6A. At that time, as shown in FIGS. 6B and 6C, the switch control signals Scb and Scc are high "H" and low "L" in level, respectively, so that change-over switch 2 is connected to the fixed contact pb and the change-over switch 3 is connected to the fixed contact mry, respectively.

Figure 6C:
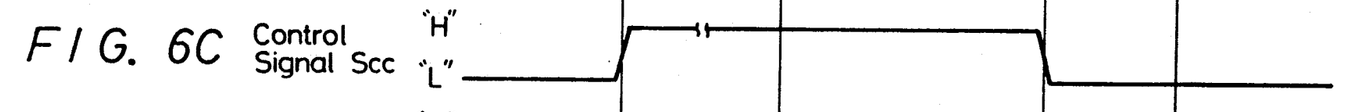
Figure 6D:
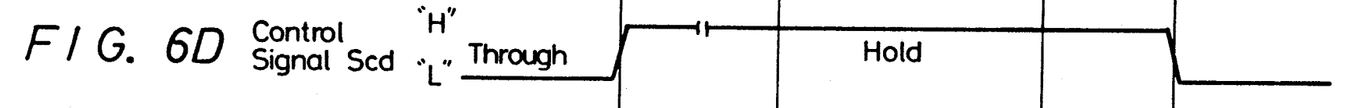
Figure 6E:
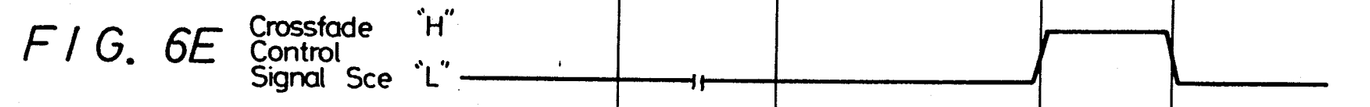

Further, as shown in FIGS. 6D and 6E, the memory control signal Scd and the crossfade control signal Sce are both low "L" in level so that field memory 11 is in the writable mode, which is the so-called through-mode, and the coefficients of the two coefficient generators 13 and 14 are both presented as k=0.

Therefore, the reproduced video signal Spb from video tape recorder 5 is supplied right through memory 11 to monitor 4, whereby a video image of a preceding scene taken by the cameraman that is to be edited, for example, the picture of a mountain as shown in FIG. 3A, is displayed on the screen of monitor 4.

If the start/stop key 7ss is operated at time point t1 to set video tape recorder 5 in the stop mode, as shown in FIG. 6A, transport of the magnetic tape is stopped and at the same time the control signal Scb is changed in level from high "H" to low "L" and the control signal Scc is changed in level from low "L" to high "H", as shown in FIGS. 6B and 6C. Thus, change-over switch 2 is connected to the fixed contact rec and change-over switch 3 is connected to the fixed contact ee. Further, as shown in FIG. 6D, the control signal Scd is changed in level from low "L" to high "H", whereby field memory 11 is changed from the through-mode to the write-inhibit mode, that is, the hold mode. At that time, switch 8 is in its closed or ON state, so that the voltage from power source 9 is supplied to the respective portions of this video signal processing apparatus.

Therefore, at the switching time point t1, the video signal of the picture reproduced from video tape recorder 5, for example, the picture of a mountain shown in FIG. 3A, is held in field memory 11 and displayed on the screen of monitor 4.

Even when the recording key 7r and the pause key 7p are simultaneously operated at time point t2 to place the video tape recorder 5 in the recording stop (REC PAUSE), mode as shown in FIG. 6A, the same condition is maintained.

In this state, video camera 1 is focused on the object of the next scene such as the jogging man of FIG. 3C, to follow the stored picture, such as the mountain of FIG. 3A reproduced from video tape recorder 5, and the fader key 7f is operated thereby to determine the scene to be crossfaded.

If at time point t3, the start/stop key 7ss is operated to release the pause mode and set video tape recorder 5 in the recording mode, as shown in FIG. 6A, the control signal Scb remains at a low level "L" and the control signal is changed in level from high "H" to low "L", as shown in FIGS. 6B and 6C, so that change-over switch 3 is connected to the fixed contact mry while change-over switch 2 remains connected to the fixed contact rec.

Then, the control signal Scd is kept at a high level "H" for a predetermined period of time, for example, one second, from time point t3 to time point t4, whereby the holding state of the field memory 11 is extended and the control signal Sce is changed to a high level "H". Thus, the crossfade circuit 12 is operated such that as k and $(1-k)$, where $(0 \leq k \leq 1)$, respectively assume the coefficients of coefficient generators 13 and 14 the output of adder 15, that is, the crossfaded video signal Sf, is expressed as in equation (1) hereinabove.

Figure 6F:
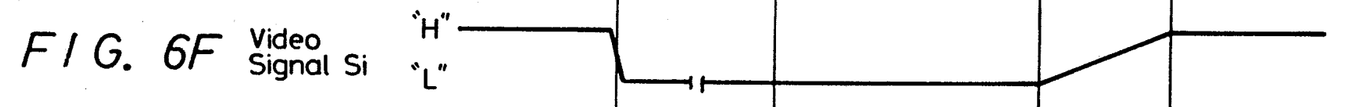
Figure 6G:
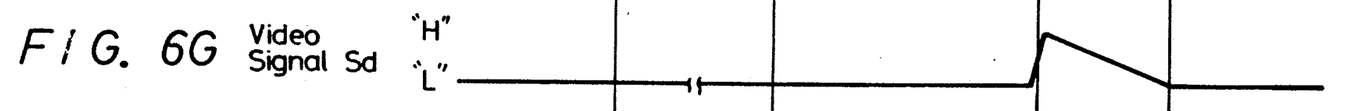

In that case, if the coefficient k is gradually increased from 0 to 1 over one second, for example, as shown in FIGS. 6F and 6G, then the still picture video signal Sd read-out from the field memory 11 is faded-out and the input real moving picture video signal Si from video camera 1 is faded-in.

During the crossfade period from time point t3 to time point t4 the preceding scene and the following scene are displayed on the screen of monitor 4 in an overlapping or coexistent condition, and the still picture video signal of the preceding scene and the real moving picture of the following scene are recorded on the magnetic tape exactly as they are displayed.

After time point t4, the real moving picture of the jogging man is displayed on the screen of monitor 4 and the mountain is eliminated, as shown in FIG. 3C, and this display is also recorded on the magnetic tape of video tape recorder 5.

Accordingly, as this magnetic tape is reproduced the scenes before and after the edit point are crossfaded across the overlapping portion.

Another embodiment of the video signal processing apparatus according to the present invention will be described with reference to FIG. 7 and FIGS. 8A to 8H, in which like parts corresponding to those of FIG. 5 are marked with the same reference numbers and are not described in detail.

Figure 7:
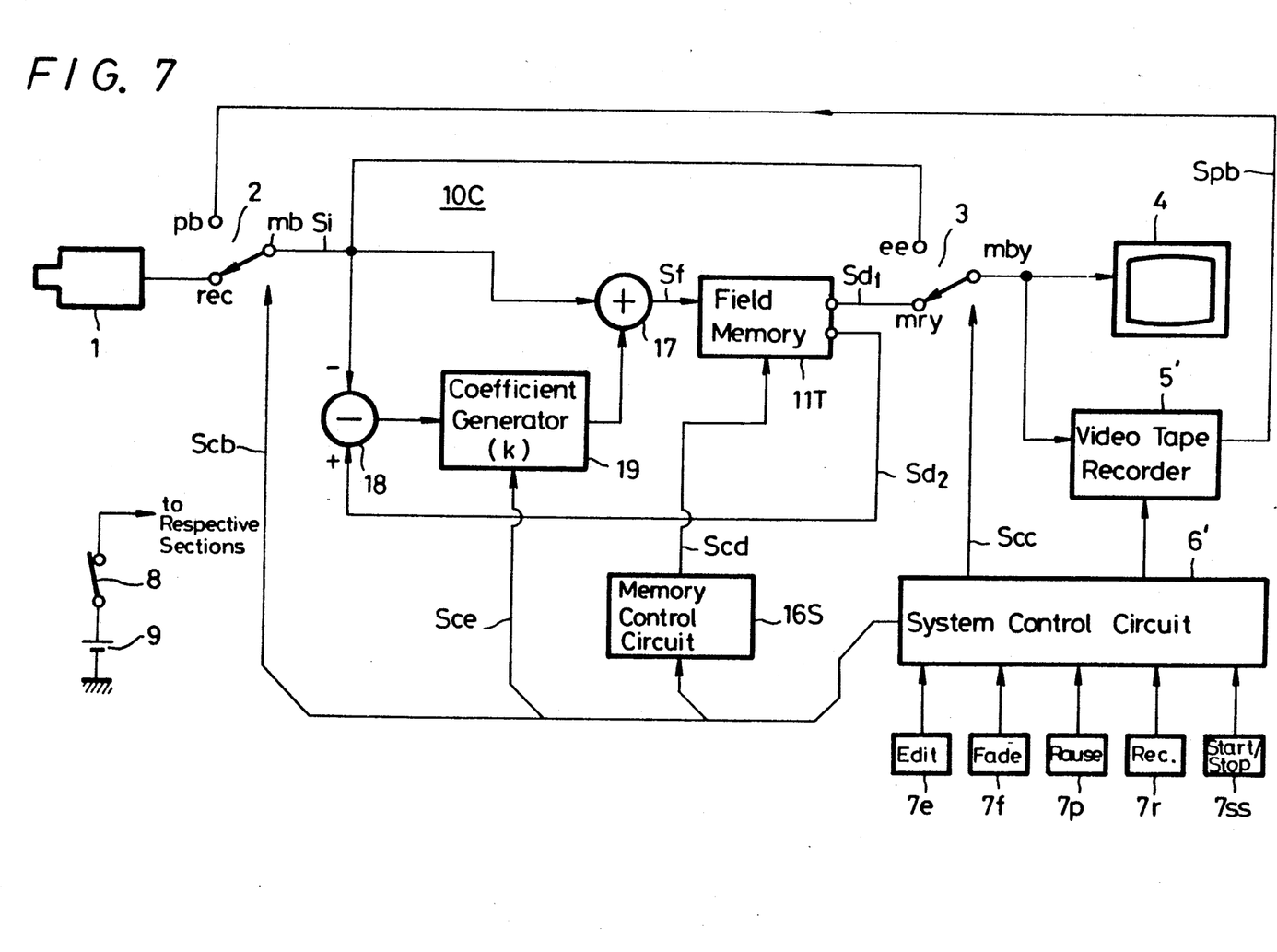
FIG. 7 is a schematic in block diagram form showing another embodiment of the video signal processing apparatus according to the present invention.

In FIG. 7, a video signal processing apparatus 10C having a closed loop including a 3-port field memory 11T is formed and a cyclic-type crossfade circuit is constructed in order to cope with a time base correction operation of the video tape recorder 5'.

The circuit arrangement of this cyclic type is analogous to that of the noise reducing circuit of Japanese Patent Published Gazette No. 62-3639 identified above.

It is known that in the case of the time base correction the timing with which data is read out from a memory is fluctuated in response to a jitter component of the reproduced signal from the video tape recorder. Whereas, in a noise operation reduction, a crossfade operation, and the like, data is read out from the memory with a fixed delay time equal to the period of one field. For this reason, the 3-port field memory is utilized to generate two independent outputs.

The incoming video signal Si from video camera 1 is commonly supplied through the fixed contact rec and the movable contact mb of change-over switch 2 to the fixed contact ee of change-over switch 3, to adder 17, and to subtracter 18. An output signal Sf from adder 17 is supplied to field memory 11T. A first delayed video signal Sd1 read out from field memory 11T, delayed by one field period, is supplied to the fixed contact mry of change-over switch 3 and a second delayed video signal Sds, which is delayed by one field period, from field memory 11T is supplied to subtracter 18, in which the input video signal Si is subtracted from the second delayed video signal Sd2. The output of subtracter 18 is supplied through a coefficient generator 19 to adder 17.

A control signal Scd from the memory control circuit 16S is supplied to field memory 11T, while memory control circuit 16S and coefficient generator 19 are supplied with respective control signals from system control circuit 6'. The remainder of the circuit of FIG. 7 is the same as that of FIG. 5.

Figures 8A, 8B:
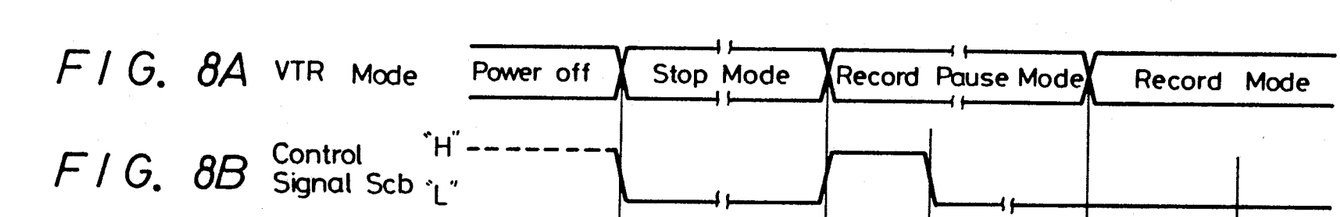
FIGS. 8A-8H are timing charts useful in explaining the operation of the embodiment of FIG. 7

The operation of the embodiment of FIG. 7 will be described with reference to FIGS. 8A and 8H and, initially, switch 8 is opened so that, as shown in FIG. 8A, the entire video signal processing apparatus is in the OFF state. In this state, as shown by dashed lines in FIGS. 8B to 8E, the control signals Scb to Sce are not generated and the connected conditions of the change-over switches 2 and 3 are indefinite.

Figure 8C:
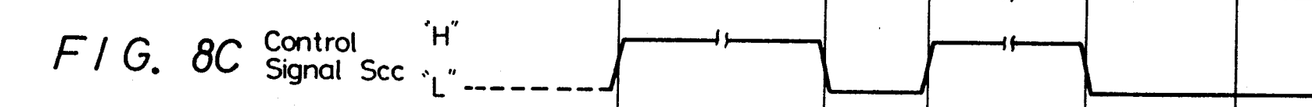
Figure 8D:
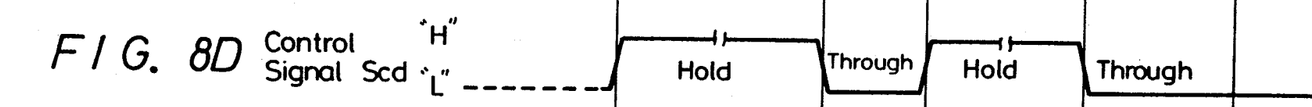

When switch 8 is closed and the power turned ON at time point t11 and the stop start key 7ss is operated to set video tape recorder 5 in the stop mode, as shown in FIG. 8A, then as shown in FIGS. 8B and 8C, the control signal Scb goes to a low level "L" and the control signal Scc goes to a high level "H", so that change-over switch 2 is connected to the fixed contact rec and change-over switch 3 is connected to the fixed contact ee. Further, as shown in FIG. 8D, the control signal Scd goes to a high level "H", so that field memory 11T is set in the hold state.

Although this state is the same as that at time point t1 in FIGS. 6A-6H, in this embodiment in order that the previous scene is properly connected to the next scene at the next recording start point, video tape recorder 5' is arranged such that the tape is rewound by a small amount at the transition time point where the previous recording mode was changed to the stop mode. As shown in FIG.. 8H, the position of the magnetic tape (not shown) of video tape recorder 5' is located slightly in the rewinding (RW) direction following the final recording point.

If video tape recorder 5' is set in the recording pause mode at time point t12, as shown in FIGS. 8B to 8E, and is placed in the playback mode at same time point t13 for a little less than one second, which would be similar to the time point before the time point t1 of FIG. 6, the switch control signals Scb and Scc go to a high level "H" and to a low level "L", respectively, and the memory control signal Scd and the crossfade control signal Sce both go to the low level "L". Then, change-over switch 3 is connected to the fixed contact rec, so that field memory 11T is set in the through-mode, resulting in the coefficients of the two coefficient generators 13 and 14 being presented as k=0.

Figure 8E:
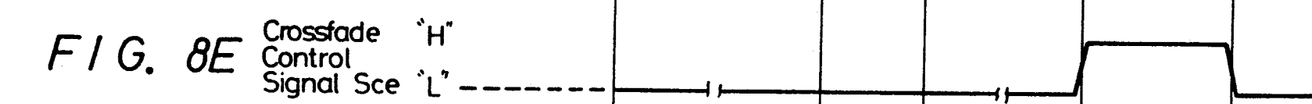
Figure 8F:
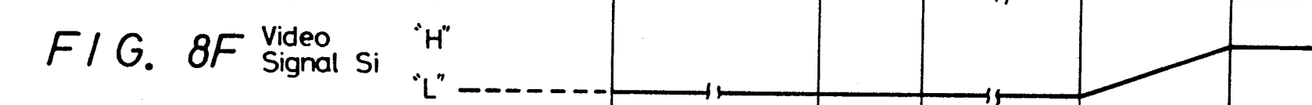
Figure 8G:
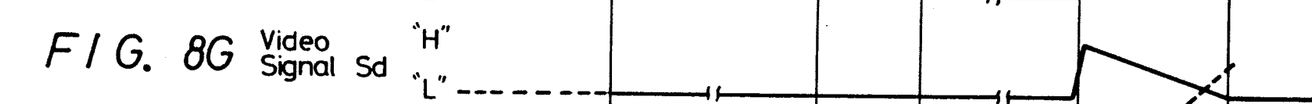
Figure 8H:
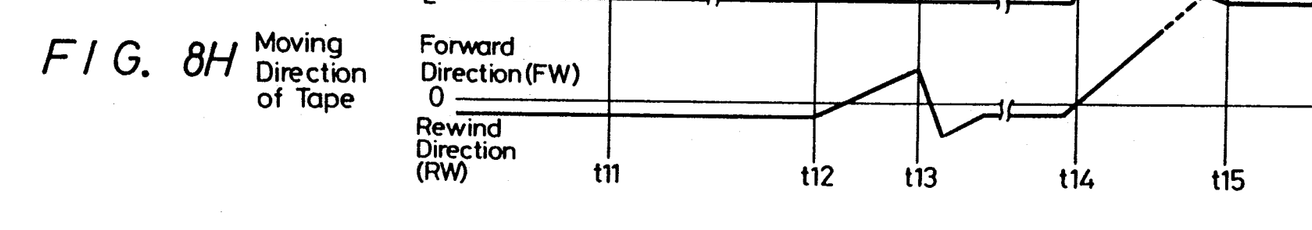

Further, as shown in FIG. 8H, the magnetic tape of the VTR is transported in the forward (FW) direction and the video image of the preceding scene shot before by the cameraman, for example, the picture of the mountain shown in FIG. 3A, is reproduced by video tape recorder 5' and the reproduced video signal Spb is supplied through field memory 11T to monitor 4.

Therefore, the video signal of the picture reproduced from video tape recorder 5 at time point t13 is held in field memory 11T, and the tape is slightly rewound as shown in FIG. 8H.

If video tape recorder 5 is set in the recording mode at time point t14 as shown in FIG. 8A, the control signals Scb and Scc go to the low level "L", as shown in FIGS. 8B and 8C, so that change-over switch 2 is connected to the fixed contact rec and change-over switch 3 is connected to the fixed contact mry. Further, as shown in FIG. 8D, the control signal Scd goes "to the low level L", so that field memory 11T is set in the through-mode.

As shown in FIG. 8E, during the period of time from the time point t14 to the next time point t15, the control signal Sce goes to the high level "H" and the following crossfade operation is carried out.

Assuming that the coefficient of the coefficient generator 19 is represented by k, where ($0 \leq k \leq 1$), then the output signal Sf of adder 17 is expressed by:

$$Sf = Si + k (Sd2 - Si) \quad (2)$$
$$= (1 - k) Si + k Sd2$$

In that case, if the coefficient k is gradually decreased from 1 to 0 during a one-second time period in a manner opposite to that of FIG. 5, as shown in FIGS. 8F and 8G, the still picture video signal Sd2 read out from the field memory 11T is faded out and, simultaneously, the input real moving picture video signal Si from video camera 1 is faded in.

As shown in FIG. 8H, the magnetic tape is transported in the forward (FW) direction during an approaching period immediately before the time point t14 to time point t15, the pictures of the preceding and following scenes are recorded on the magnetic tape in an overlapping or coexistent condition. After the time point t15, the real moving picture of the following scene is recorded on the magnetic tape and the scenes before and after the edit-point are smoothly crossfaded.

In the embodiment of FIG. 7, the crossfade circuit forms a closed loop and is constructed as a cyclic type wherein the video signal read out from field memory 11T line-by-line is supplied through this closed loop and is again written in field memory 11T. Because of the signal processing time in coefficient generator 19 and the like, the line in which the video signal that is multi- plied by the coefficient is written becomes the same line from which the original video signal is read out.

According to the embodiment of FIG. 7 of the present invention, the timing control of field memory 11T can be simplified and the circuit scale of memory control circuit 16S can be reduced as compared with the embodiment of FIG. 5. Although a field memory is utilized in the above-described embodiments, the field memory may be replaced by a frame memory.

When the crossfade circuit is constructed as the cyclic type by forming a closed loop, as in the embodiment of FIG. 7, the video signal processing apparatus of the present invention can be applied to a noise reduction operation, to a so-called multi-strobe operation, or to a clean still/slow playback or the like by properly determining the data pattern of the coefficient generator.

As set out above in detail, according to the present invention, the desired video signal reproduced from the video tape recorder is written in the field memory or in the frame memory. Also, when the video camera starts its operation, the real moving picture video signal from the video camera and the still picture video signal from the memory are crossfaded, whereby the video signal processing apparatus of simplified arrangement can crossfade the scenes at the edit point.

Having described preferred embodiments of the invention with reference to the accompanying drawings, it is to be understood that the invention is not limited to those precise embodiments and that various changes and modifications thereof may be effected by one skilled in the art without departing from the spirit or scope of the novel concept of the invention, as defined in the appended claims.

What we claim is:

1. A video signal processing apparatus for use with a video camera, comprising:
   memory means for storing a selected field or frame period of a real moving picture video signal produced by the video camera when the video camera stops operation; and
   crossfading means connected to said memory means and to the video camera so that when said video camera begins operation following the stop in operation, the real moving picture video signal being produced by the video camera and a still picture video signal readout from said memory means are crossfaded;
   wherein said crossfading means comprises a pair of coefficient generators and an adder, one of said pair of coefficient generators having an input connected to said memory means and the other of said pair of coefficient generators having an input connected to the video camera, outputs of said pair of coefficient generators being fed to said adder, the output of said adder being a crossfaded signal.

2. The video signal processing apparatus according to claim 1 wherein said memory means comprises a field memory.

3. A video signal processing apparatus for use with a video camera, comprising:
   memory means for storing a selected field or frame period of a real moving picture video signal produced by the video camera when the video camera stops operation; and
   crossfading means connected to said memory means and to the video camera so that when said video camera begins operation following the stop in operation, the real moving picture video signal being produced by the video camera and a still picture video signal readout from said memory means are crossfaded;

wherein said crossfading means comprises a pair of coefficient generators and an adder, one of said pair of coefficient generators having an input connected to said memory means and the other of said pair of coefficient generators having an input connected to the video camera, outputs of said pair of coefficient generators being fed to said adder, the output of said adder being a crossfaded signal;

wherein each of said pair of coefficient generators includes a read only memory in which predetermined coefficient data is stored.

4. The video signal processing apparatus according to claim 3 wherein the predetermined coefficient data in one of said pair of coefficient generators varies from zero to one, whereas the predetermined coefficient data in the other of said pair of coefficient generators varies from one to zero.

5. A video signal processing apparatus for use with a video camera and a video tape recorder, comprising:

memory means for storing a selected field or frame of a real moving picture video signal reproduced from the video tape recorder; and crossfading means connected to the video camera and said memory means, so that when the video camera commences operation, a real moving picture video signal from the video camera and a still picture video signal read out from memory means are crossfaded;

wherein said crossfading means comprises a cyclic-type crossfading circuit including a subtracter for subtracting an output signal of the video camera from an output signal of said memory means, a coefficient generator for varying an output signal from said subtracter in accordance with a predetermined variable coefficient, and an adder for adding the output signal from the video camera and the output signal from said coefficient generator and producing a summed signal forming a crossfaded signal and fed back to an input of said memory means.

6. The video signal processing apparatus according to claim 5, wherein said memory means comprises a field memory.

7. The video signal processing apparatus according to claim 6, wherein said memory means comprises a 3-port field memory.

8. A video signal processing apparatus for use with a video camera and a video tape recorder, comprising:

memory means for storing a selected field or frame of a real moving picture video signal reproduced from the video tape recorder; and crossfading means connected to the video camera and said memory means, so that when the video camera commences operation, a real moving picture video signal from the video camera and a still picture video signal read out from memory means are crossfaded;

wherein said crossfading means comprises a cyclic-type crossfading circuit including a subtracter for subtracting an output signal of the video camera form an output signal of said memory means, a coefficient generator for varying an output signal from said subtracter in accordance with a predetermined variable coefficient, and an adder for adding the output signal from the video camera and the output signal from said coefficient generator and producing a summed signal forming a crossfaded signal and fed back to an input of said memory means;

wherein said coefficient generator includes a read only memory in which predetermined coefficient data is stored and that varies from zero to one.

9. The video signal processing apparatus according to claim 5 further comprising a switch means and a video monitor, whereby said switch means selectively connects the crossfaded signal to the video monitor for display and to the video tape recorder for recording.

* * * * *

UNITED STATES PATENT AND TRADEMARK OFFICE
CERTIFICATE OF CORRECTION

PATENT NO. : 5,168,363
DATED : December 1, 1992
INVENTOR(S) : Masaaki Kojima, et al.

It is certified that error appears in the above-indentified patent and that said Letters Patent is hereby corrected as shown below:

On the title page, item (54) and column 1, "Parocessing" should read --Processing--.

```
Col. 2, line 68, after "the" insert --like are--
Col. 3, line 11, change "show" to --shown--
Col. 4, line 64, change "1B" to --18--

Col. 12, line 4, delete ","
         line 7, delete ","
         line 23, change "form" to --from--
```

Signed and Sealed this

Twenty-eighth Day of June, 1994

Attest:

BRUCE LEHMAN

*Attesting Officer*    *Commissioner of Patents and Trademarks*